US008291653B2

(12) United States Patent
Suarez et al.

(10) Patent No.: US 8,291,653 B2
(45) Date of Patent: Oct. 23, 2012

(54) MODULAR STRUCTURAL FRAMING SYSTEM

(75) Inventors: Juan Suarez, Albuquerque, NM (US);
Jim Webb, Albuquerque, NM (US);
Laura Devitt, Albuquerque, NM (US);
Chris M. Meier, Albuquerque, NM (US); Stacy Harris, Albuquerque, NM (US)

(73) Assignee: UniRac, Inc., Albuquerque, NM (US)

( * ) Notice: Subject to any disclaimer, the term of this patent is extended or adjusted under 35 U.S.C. 154(b) by 72 days.

(21) Appl. No.: 12/819,582

(22) Filed: Jun. 21, 2010

(65) Prior Publication Data
US 2010/0319277 A1 Dec. 23, 2010

Related U.S. Application Data

(60) Provisional application No. 61/218,660, filed on Jun. 19, 2009.

(51) Int. Cl.
*E04D 13/18* (2006.01)
*E04H 14/00* (2006.01)

(52) U.S. Cl. ..................... 52/173.3; 52/653.1
(58) Field of Classification Search ................. 52/648.1, 52/653.1, 173.3, 650.1
See application file for complete search history.

(56) References Cited

U.S. PATENT DOCUMENTS

| 5,143,556 | A | 9/1992 | Matlin |
| 5,992,121 | A | 11/1999 | Lindsay |
| 6,465,724 | B1 | 10/2002 | Garvison et al. |
| 7,814,899 | B1* | 10/2010 | Port ............................ 126/623 |
| 2004/0163338 | A1* | 8/2004 | Liebendorfer ............... 52/173.1 |
| 2009/0025314 | A1* | 1/2009 | Komamine et al. .......... 52/173.3 |
| 2011/0173900 | A1* | 7/2011 | Plaisted et al. .................... 52/97 |

OTHER PUBLICATIONS

PCT/US2010/039326 International Search Report (mailed Aug. 19, 2010) (3 pages).

* cited by examiner

*Primary Examiner* — Brian Glessner
*Assistant Examiner* — Paola Agudelo
(74) *Attorney, Agent, or Firm* — Crowell & Moring LLP

(57) ABSTRACT

The present invention generally relates to a modular, structural framing system.

7 Claims, 10 Drawing Sheets

MODULAR STRUCTURAL FRAMING SYSTEM

RELATED APPLICATION

This application claims priority under 35 USC §119 to U.S. Provisional Application No. 61/218,660 filed Jun. 19, 2009, the disclosure of which is incorporated by reference herein in its entirety.

FIELD OF EMBODIMENTS OF THE INVENTION

Non-limiting embodiments of the present invention generally relate to a modular, structural framing system. The modular structural framing system disclosed herein is generally comprised of a unique I-beam structural member as well as a bracket compatible with the I-beam structural member. While the structural framing system is suitable and adaptable for many uses, one specific use is as a structural framing system for photovoltaic panels.

BACKGROUND OF EMBODIMENTS OF THE INVENTION

Modular structural framing systems have a variety of both commercial and non-commercial uses. Some of the benefits associated with modular structural framing systems are its multi-functional uses and relative ease of installation. However, some of the drawbacks of current framing systems include their high costs (both material and labor) and the need for specialized equipment and multiple tradesmen for assembly (such as welders, iron workers or concrete finishers).

The biggest disadvantage of current framing systems is the need for "field fabrication." Field fabrication is the customization or alteration of structural members that comprise the framing system through drilling, cutting, punching or welding to achieve structural connections. Field fabrication usually requires labor intensive modifications to the structural framing system itself, and possibly to the physical environment where the system will reside. Thus, field fabrication increases the costs associated with the structural framing system and makes its installation more cumbersome.

Structural framing systems that require minimal field fabrication exist in the marketplace. The structural strength of these systems is limited due to the design of the structural members and connectors. Even when standard hot-rolled structural I-beams are used, these systems typically require numerous pieces of hardware (nuts, bolts and connector plates) and are thus cumbersome to assemble.

A structural framing system that is light-weight, structurally secure, cost-effective, and easy to assemble with minimal use of hardware would be in high demand. Furthermore, a structural framing system that can be adapted to serve many different functions based on one's design need would particularly be useful. For example, as the use of solar panels to generate all or part of the electrical needs for residential and commercial properties increases, there has been an increase in demand for modular photovoltaic structural framing systems. Therefore, a modular structural framing system that minimizes the need for field fabrication techniques such as welding, drilling or riveting is needed.

SUMMARY OF EMBODIMENTS OF THE INVENTION

An object of an illustrative, non-limiting embodiment of the present invention overcomes the above and other problems and disadvantages associated with the current design of modular structural framing systems. Also, the present invention is not required to overcome the disadvantages described above, and exemplary embodiments of the present invention may overcome other disadvantages or may not overcome any disadvantages.

One embodiment relates to a modular structural framing system. The key to this framing system is a unique bracket that eliminates or minimizes the need for field fabrication as well as the unique I-beam structural members. Accordingly, a structural framing system comprising at least one I-beam structural member and at least one bracket having an aperture, the bracket capable of connecting to one flange of the I-beam structural member by hooking or grasping the flange is disclosed.

Another embodiment relates to a photovoltaic structural framing system for use in large scale, ground mounted, high volume photovoltaic panel installation comprising a vertical I-beam support member, at least two friction clamps affixed to the vertical I-beam support member by thru bolts or set screws, a diagonal support brace, an I-beam or C-channel top chord, at least one horizontal I-beam support member, and I-beam rail members, wherein the diagonal support brace is connected to the lower friction clamp affixed to the vertical I-beam support member by thru bolts, wherein the other end of the diagonal support brace is connected to the I-beam or C-channel top chord, wherein the I-beam or C-channel top chord is connected to the upper friction clamp affixed to the vertical I-beam support member by thru bolts, wherein the horizontal I-beam support member is connected to the I-beam or C-channel top chord by a U-bracket capable of both connecting top chord channels using thru bolts and connecting the horizontal support member using thru bolts, wherein the I-beam rail member connects to the horizontal support members by the bracket capable of both connecting the I-beam flange of the rail member using a thru bolt and hooking the flange of the horizontal support member, and wherein the photovoltaic panels connect to the I-beam rail member by brackets.

The modular structural framing system disclosed herein may further comprise a base foundation. The base foundation may either be the earthen ground or concrete.

In some embodiments, the vertical support member is a pile driven, hot-rolled steel I-beam.

Another embodiment relates to a photovoltaic structural framing system for ground mounted, high volume photovoltaic panel installation comprising a vertical I-beam support member, at least two friction clamps affixed to the vertical I-beam support member by thru bolts or set screws, a diagonal support brace, an I-beam or C-channel top chord, at least one horizontal I-beam support member, and an I-beam rail member, wherein the diagonal support brace is connected to the lower friction clamp affixed to the vertical I-beam support member by thru bolts, wherein the other end of the diagonal support brace is connected to the C-channel top chord, wherein the I-beam top chord is connected to the upper friction clamp affixed to the vertical I-beam support member by thru bolts, wherein the horizontal I-beam support member is connected to the C-channel top chord by a U-bracket capable of both connecting top chord channels using thru bolts and connecting the horizontal support member using thru bolts, wherein the I-beam rail member connects to the horizontal support members by a bracket capable of both connecting the I-beam flange of the rail member using a thru bolt and hooking the flange of the horizontal support member, and wherein the photovoltaic panels connect to the I-beam rail member by brackets.

Other embodiments disclose a structural framing system suitable for mounting various types of modules. In yet another embodiment, several of the structural framing systems can be combined to create an array of structural framing systems for multiple purposes.

BRIEF DESCRIPTION OF THE DRAWINGS

The above and other objects and advantages of illustrative, non-limiting embodiments of the present invention will become more apparent by describing them in detail with reference to the attached drawings.

FIGS. 4B-4C show two different views of a top chord with a U-clamp interposed between the individual C-shaped pieces that make up the top chord.

DETAILED DESCRIPTION OF THE INVENTION

Figure 1:
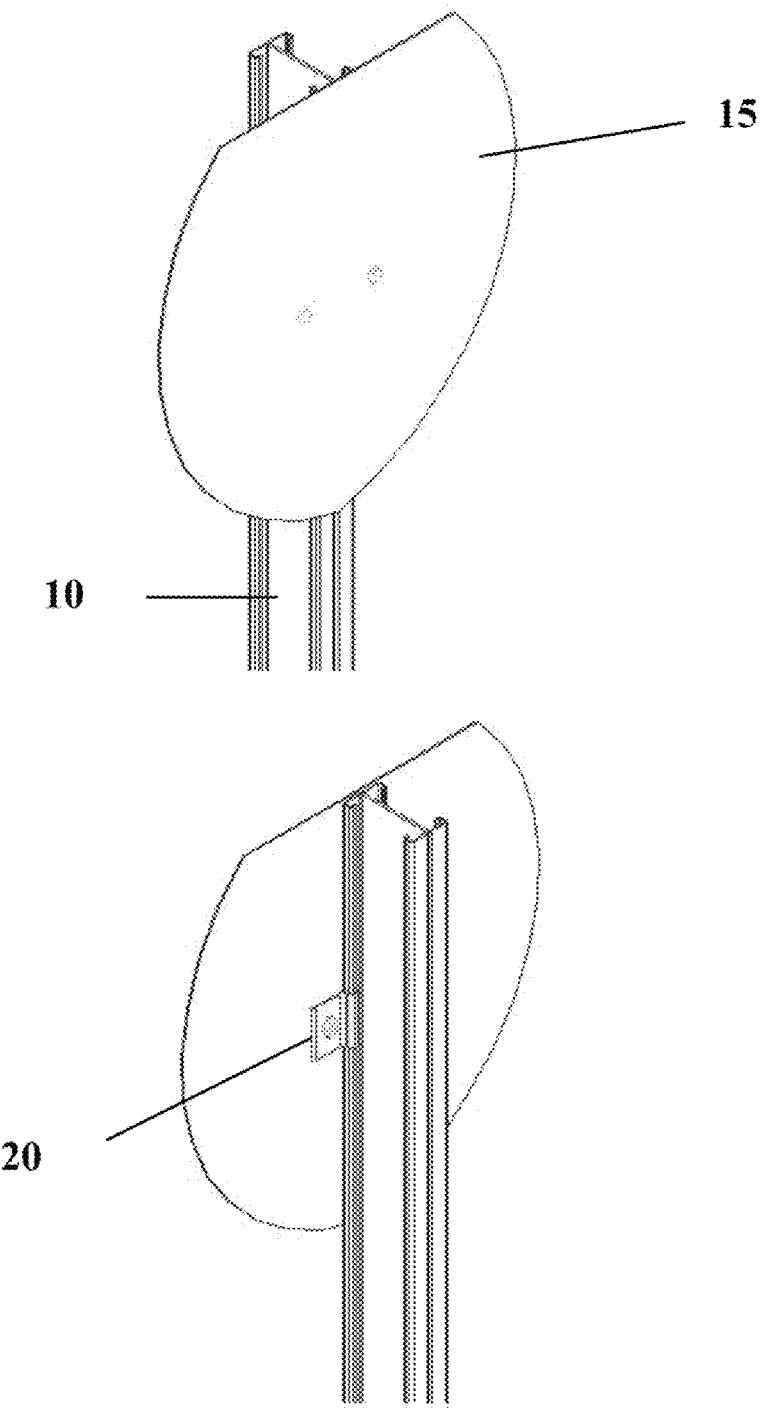
FIG. 1 shows front and rear views of a sign post utilizing the structural framing system. The unique brackets attach to the I-beam's structural flanges and are fastened to the sign.

The following description of illustrative, non-limiting embodiments discloses specific dimensions, configurations, components, and processes. However, the embodiments are merely examples of the present invention, and thus the specific features described are merely used to more easily describe such embodiments and to provide an overall understanding for the present invention. Accordingly, one skilled in the art will readily recognize that the present invention is not limited to the specific embodiments described below. Furthermore, the descriptions of various dimensions, configurations, components and processes of the embodiments that would have been known to one skilled in the art are omitted for the sake of clarity and brevity.

The modular structural framing system has been designed to build lightweight, easily assembled structures that are affordable and minimize installation labor. Primary design elements of the system include scalability for a variety of ground and roof top installations, adaptability to a variety of different foundation types, adaptability to various photovoltaic module types, and pre-assembly of sub-structures for more efficient field installation.

The majority of installation labor on existing systems comes from field fabrication techniques such as welding, drilling or riveting. The modular framing system described herein uses a bracket that eliminates or minimizes that field fabrication. While other similar systems exist that also minimizes field fabrication, this system is the first of its kind to be based on a uniquely designed I-beam structural member and a bracket capable of engaging the uniquely designed I-beam's flange.

The bracket disclosed herein has an aperture through which thru bolts can pass and used to fasten two structural members. The design of the brackets allow two I-beam structural members of the present invention to be connected to one another using at least two brackets, a thru bolt and nut. In addition, the brackets disclosed herein can also be used to fasten any module (such as a sign, sheathing, photovoltaic module, etc.) or accessory (conduit clamp, wire management components, etc.) to the structural member. The brackets can slide along the length of the I-beam structural members, allowing for greater flexibility in the design of the structural framing system. Because the design of the I-beam structural member can be custom manufactured, the dimensions and design of the bracket may also vary so long as the bracket can engage the unique flange design of the I-beam structural member and has at least one aperture.

The unique design of the I-beam structural member is optimized for strength, weight, strong axis bending and lateral buckling. The flanges of the I-beam are critical to make sure the beam does not buckle when loaded along the strong axis. The I-beams of the structural member disclosed herein are made out of very thin material. Normally, the thinness of the I-beams would increase the likelihood of local buckling in the flanges. However, the unique design of the I-beam's flanges minimizes local buckling. The modular structural framing system could also be modified to work with other structural shapes including, but not limited to, C-channels, Z-Purlins, sigma profiles, U-channels or hat channels. Unless noted otherwise, all I-beams used herein specifically refer to the unique I-beam design of the structural framing system disclosed herein.

The structural members of the modular structural framing system described are constructed from steel on account of its high strength to weight ratio as well as its capacity for high volume production. However, one of ordinary skill in the art could create embodiments of the invention constructed of, but not limited to, aluminum, fiberglass, carbon fiber or titanium.

Compared to standard hot formed steel I-beams, the I-beam structural members of the structural framing system disclosed have a unique manufacturing process. For steel structural I-beam members of the present invention, cold formed steel sheets are shaped into C-shapes, and the two C-shapes are joined together to form the I-beam. This cold roll forming process may also be used to convert aluminum sheet material to structural shapes. The same shape can be replicated using other materials and different manufacturing processes. For example, if the structural members are made from aluminum, an alternate process involves an aluminum billet being pushed (i.e., extruded) through a C-shaped die to form the C-shapes that will be joined to form the I-beam structural member. Similarly, fiberglass or carbon fiber will be pulled through (i.e., pultruded) a C-shaped die to form the unique I-beam design disclosed herein.

Figure 4A:
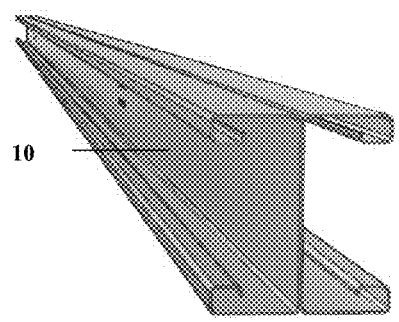
FIGS. 4A, 4B and 4C are views of the unique I-beam design of the structural members. In these figures, the unique flange design that prevents the I-beam from buckling is shown.
Figure 4B:
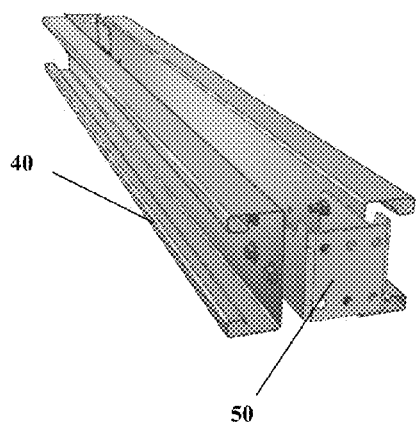
Figure 4C:
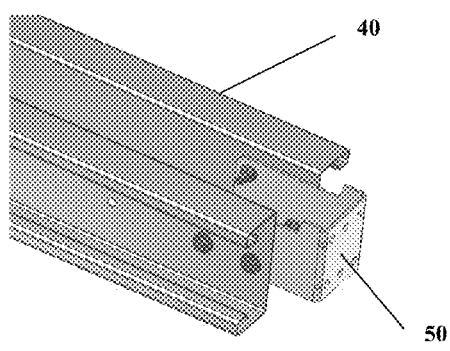
Figure 5:
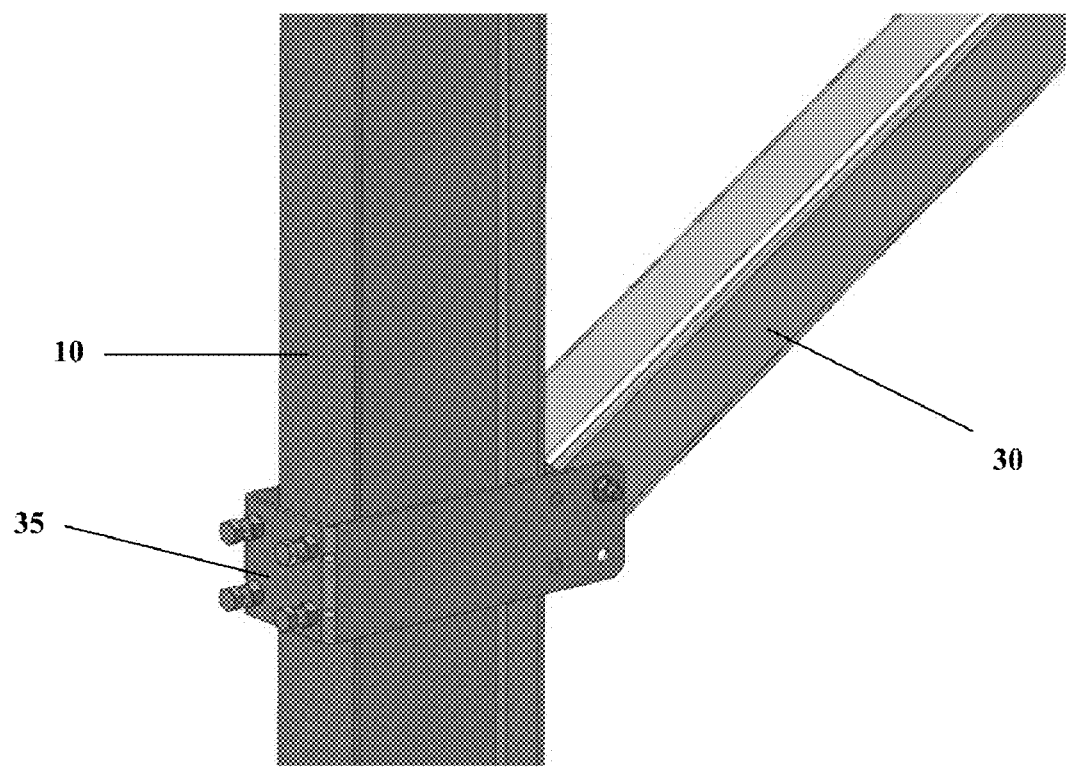
FIG. 5 shows how the vertical column and the diagonal brace are connected by the lower friction U-clamp.
Figure 6:
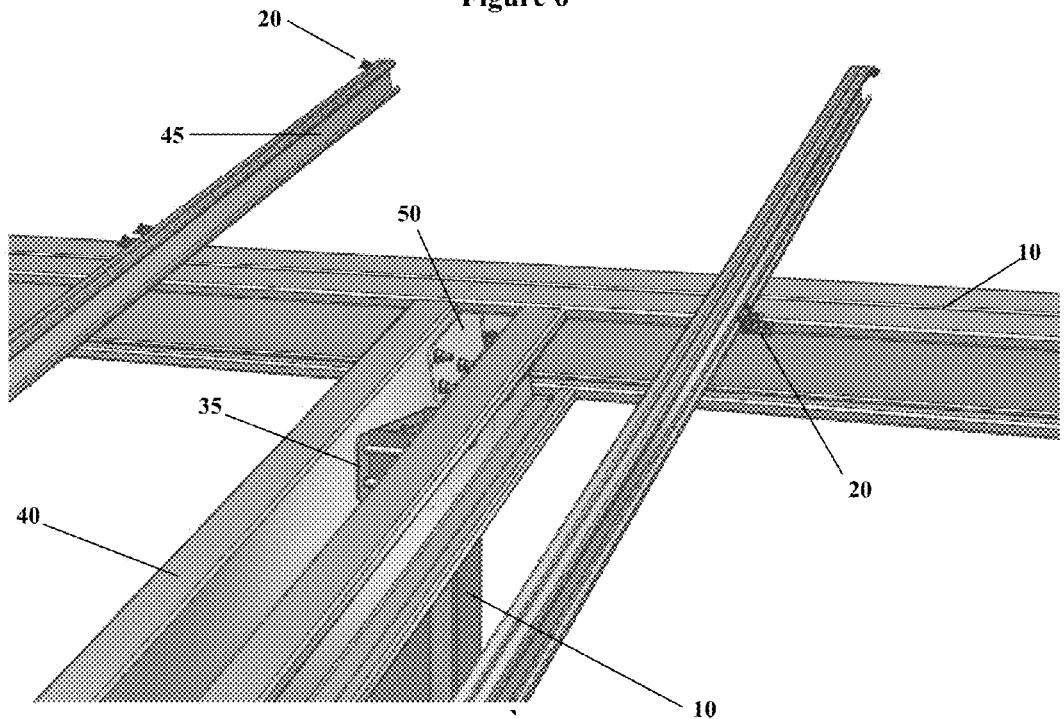
FIG. 6 depicts the connection between the top chord and the vertical structural member. The C-channel members of the top chord attach with thru bolts to the upper U-clamp friction bracket that is affixed to the vertical column. Also shown are a horizontal I-beam support member, two I-beam rail members and associated connection brackets. The U-clamp bracket affixed to the ends of the top chord C-channels connects the top chord to the horizontal member, while the other brackets shown connect the rail members to the horizontal support member.
Figure 7:
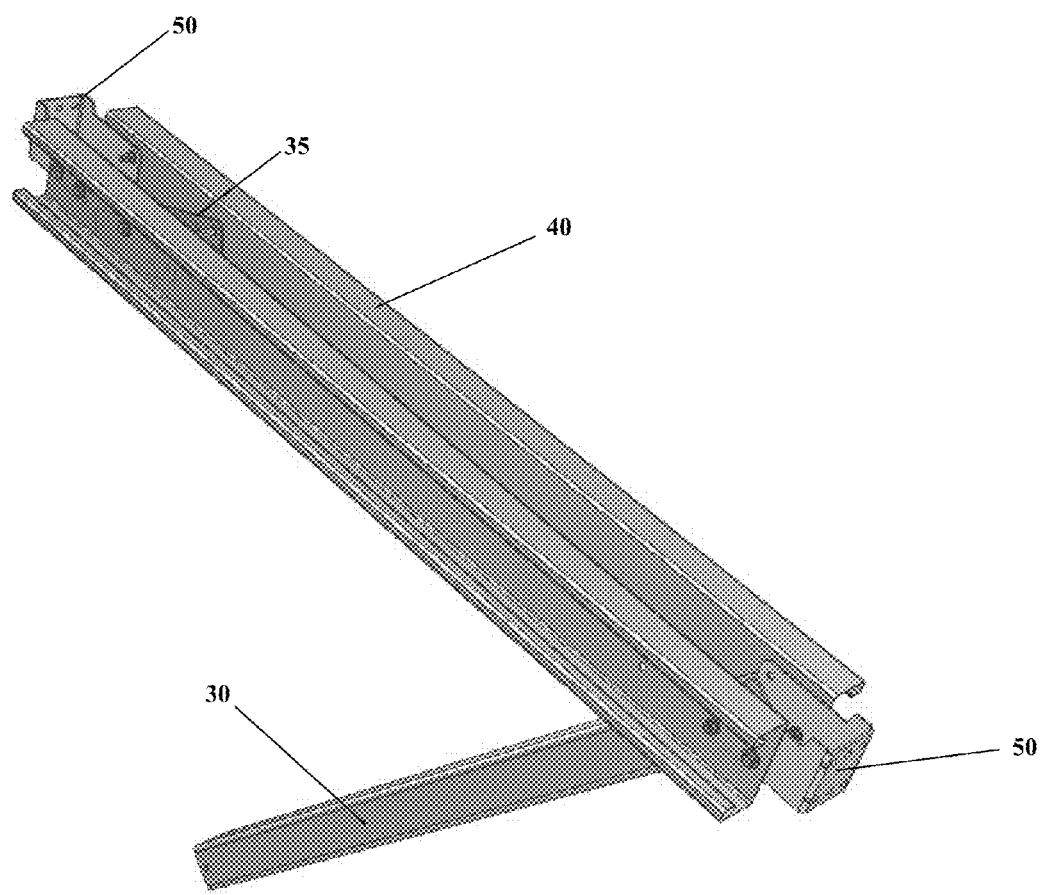
FIG. 7 is a view of a complete top chord assembly with top chord channels, U-clamp brackets, and diagonal brace.

Because the unique I-beam design of the present invention is fabricated from two separate C-shapes, the channels can be used in different assembly arrangements other than direct joining at the channel webs. In the example of the ground mounted module mounting structure, the C-channels are joined together by a U-clamp and thru bolts at each end to form a top chord assembly (FIG. 4B). The U-clamp may also be used for the connection of the top chord to the vertical column using thru bolts (FIG. 6). In addition, I-beams having apertures in the flanges and/or the truss through which thru bolts are fastened are also disclosed.

Figure 8:
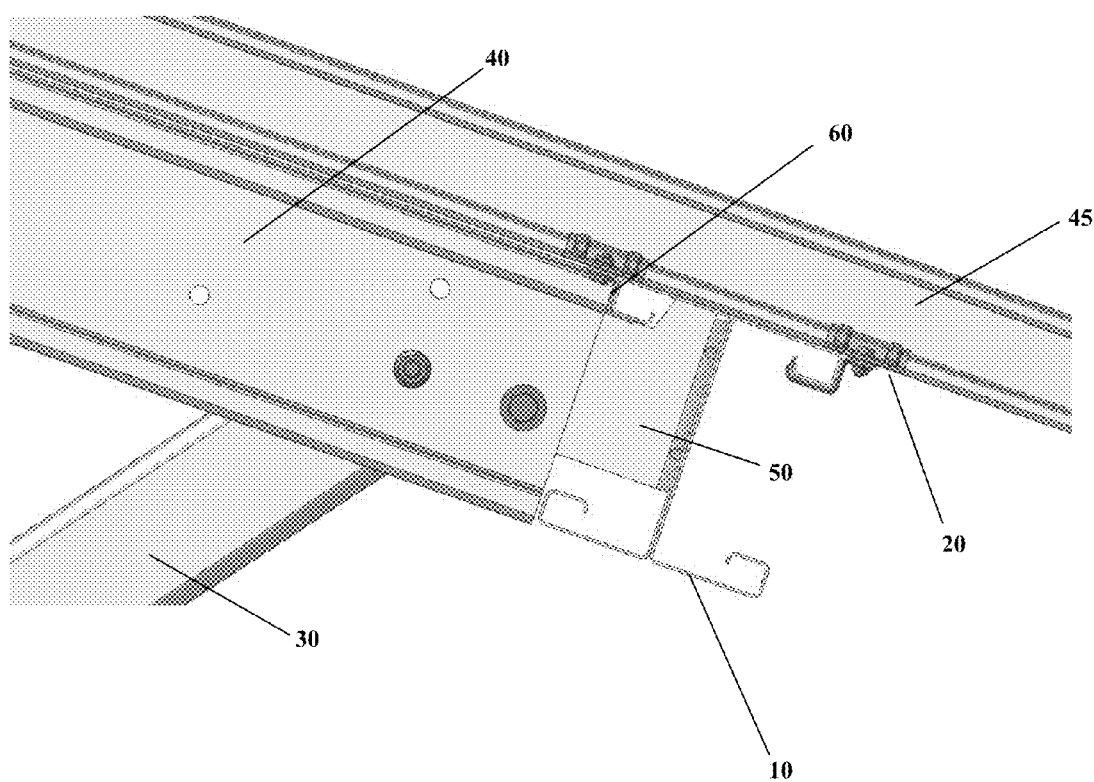
FIG. 8 is a view of a horizontal diagonal brace connection to a top chord, a horizontal I-beam member connected to a top chord, and an I-beam rail member connected to a horizontal I-beam member. The upper side of the rail member connects to the horizontal member using a slide clip connection.

As noted above, the basic bracket designs allow one bracket to be "hooked" onto the flange of a structural member. By aligning the apertures of two brackets "hooked" to two different structural members and fastening the brackets together with a thru bolt and nut, two structural members can be joined together. The bracket design produces high amounts of frictional force between the two structural members to keep them in place. In addition to fastening together two structural members, the bracket design also allows the user to fasten a panel, sheathing, decking or photovoltaic modules to the surface of the structural member using a thru bolt. Similarly, a slide clip 60 (FIG. 8) can be fastened to the structural member to enable another structural member to be slipped into place.

Figure 2:
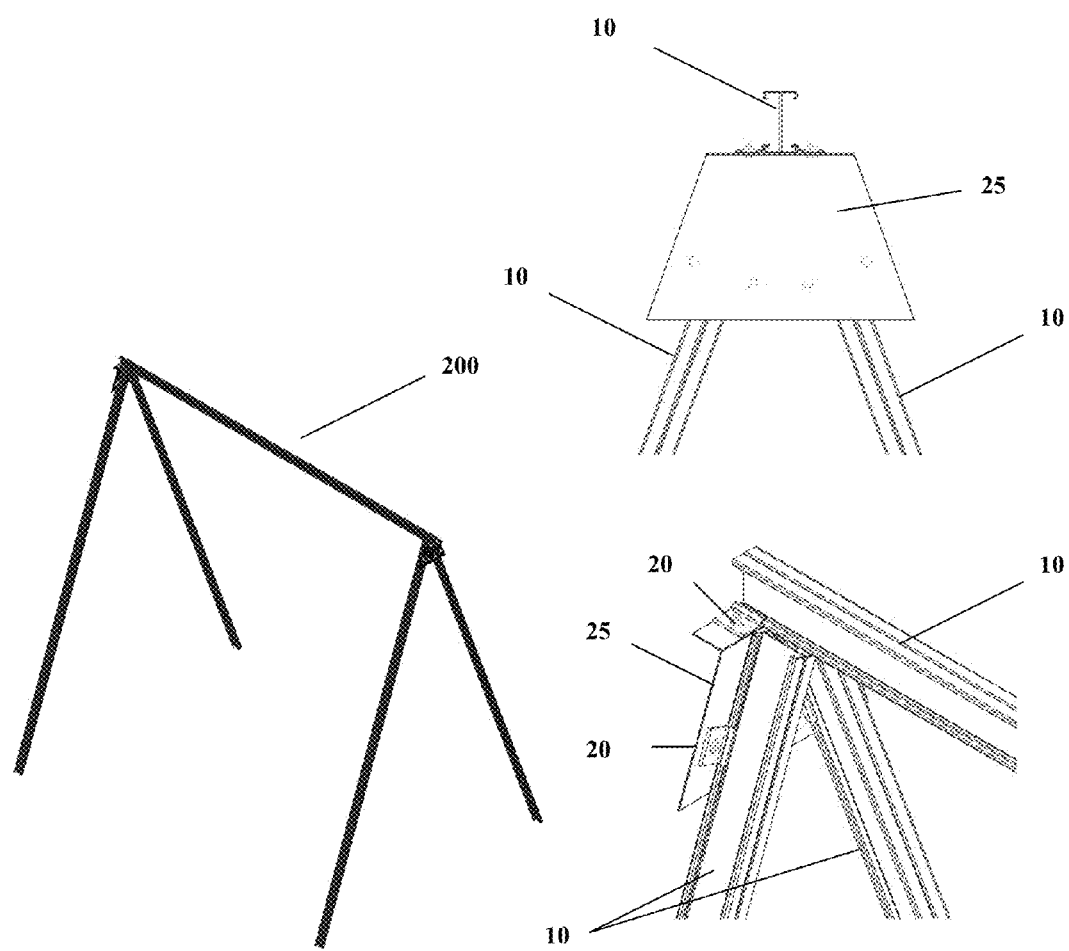
FIG. 2 shows different views of an A-frame swing set that uses the structural framing system. The structural I-beam members are connected together using brackets and a connecting shear plate.
Figure 3:
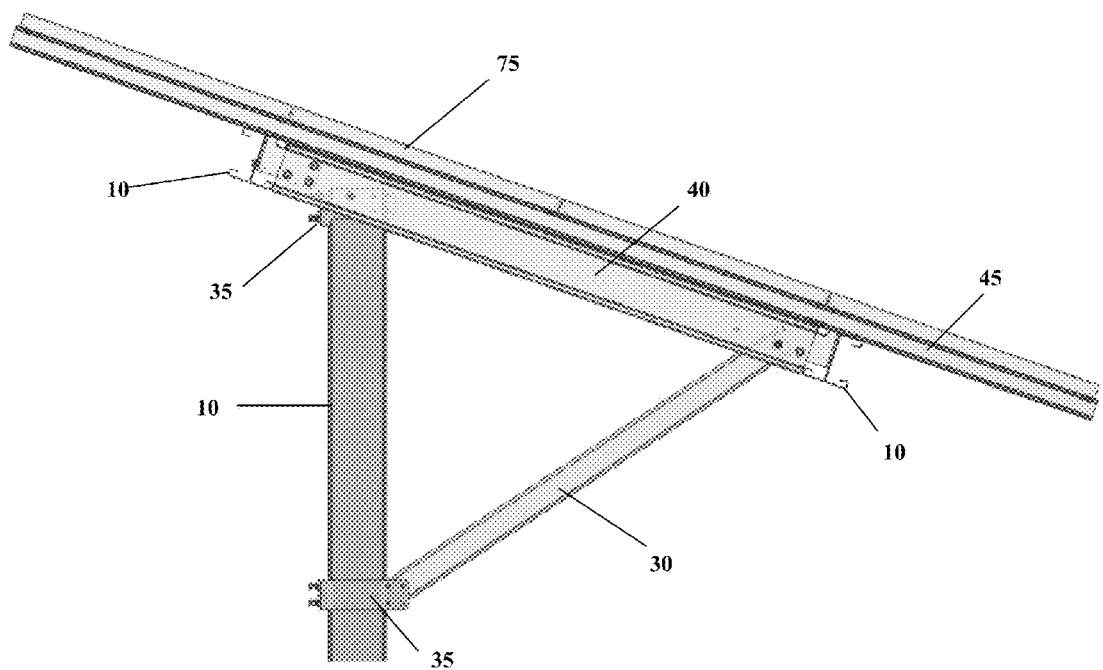
FIG. 3 depicts a side view of an embodiment of the ground mounted structural framing system for photovoltaic modules.

The simplest modular structural framing system comprises at least one vertical I-beam member 10 and at least one bracket 20 capable of hooking the flange of the vertical I-beam member (FIG. 1). The bracket also has an aperture through which a thru bolt can be passed and which could also connect, for example, a sign 15. One of ordinary skill in the art can readily envision numerous embodiments that employ the I-beam structural members and brackets of the present invention. For example, a swing set 200 can be designed using the framing system disclosed herein (FIG. 2). Here, a specially designed connector plate 25 is used to join the I-beam structural members 10 to form the framework for the swing set and several brackets 20 are used to connect the I-beam structural members 10 to the connector plate 25.

In a more complex structural framing system design, such as for a ground mounted structural framing system for photovoltaic arrays, two components typically comprise the structural framing system: (1) the support structure and (2) the module mounting structure. The support structure comprises a vertical I-beam support member 10, at least two sliding clamps 35 attached to the vertical I-beam support member 10, a diagonal support brace 30, and an I-beam top chord 40. The module mounting structure comprises at least one horizontal I-beam support member 10, an I-beam rail member 45, and with respect to a photovoltaic structural framing system, photovoltaic panels 75. The individual structural members of the modular structural framing system are light gauge I-beam structures that are joined together with U-clamp brackets 50 and/or brackets 20. U-clamp brackets 50 are bolted to the I-beam or C-channel webs and vertical I-beam supports 10, while brackets 20 fasten together two structural I-beams using threaded fasteners. This structure can be used in other geometries and configurations based on site conditions, other restrictions or limitations.

Figure 9:
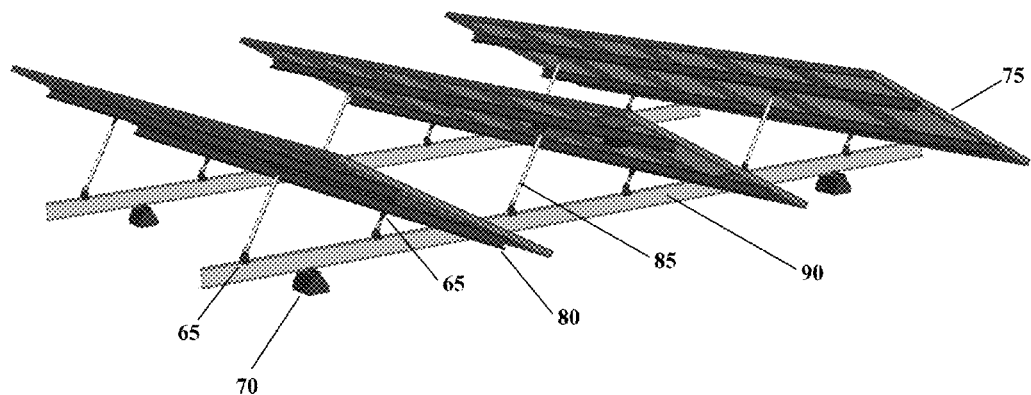
FIG. 9 is a view of a complete photovoltaic structural framing system for use in large scale, commercial roof mounted installations, including roof support bases, main horizontal members, tilt supports, module support rails, modules, and connecting brackets.
Figure 10:
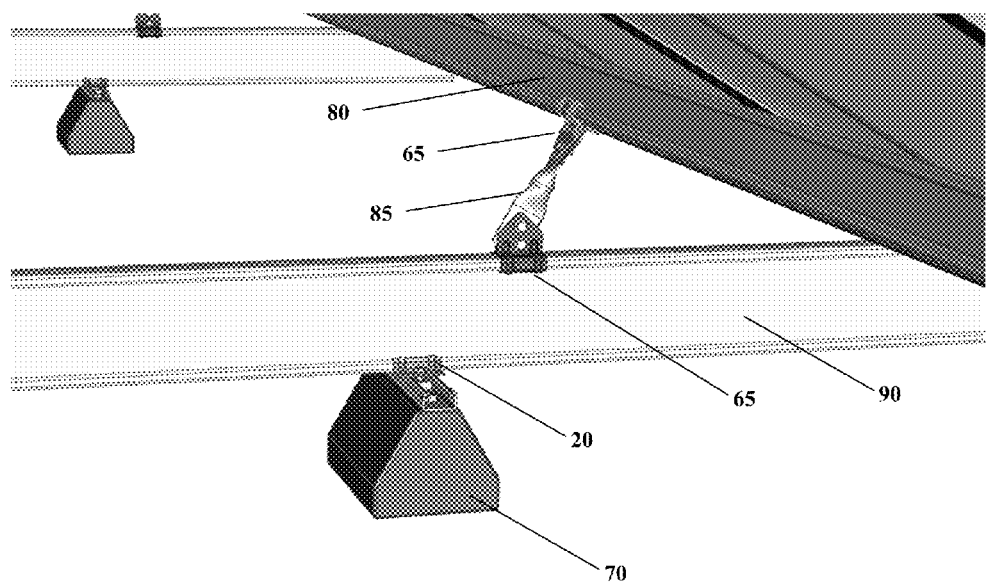
FIG. 10 is a view of a roof support base connection to a horizontal member and tilt support connections to horizontal and rail support members with clamp brackets and thru bolts.

In a structural framing system design, such as for a roof mounted structural framing system for photovoltaic arrays (FIG. 9 and FIG. 10), the main horizontal I-beam members 90 are attached to roof contact support bases 70 with a bracket 20. The module support rails 80 are positioned and joined to the main support beams 90 with the upright/tilt supports 85 using the clamp brackets 65 and thru bolts and nuts. The upright supports 85 provide the desired tilt angle for the final module 75 position. The clamp brackets 65 connect the supports 85 to the flanges of the main support members 90 and flanges of the module support rails 80.

Figure 11:
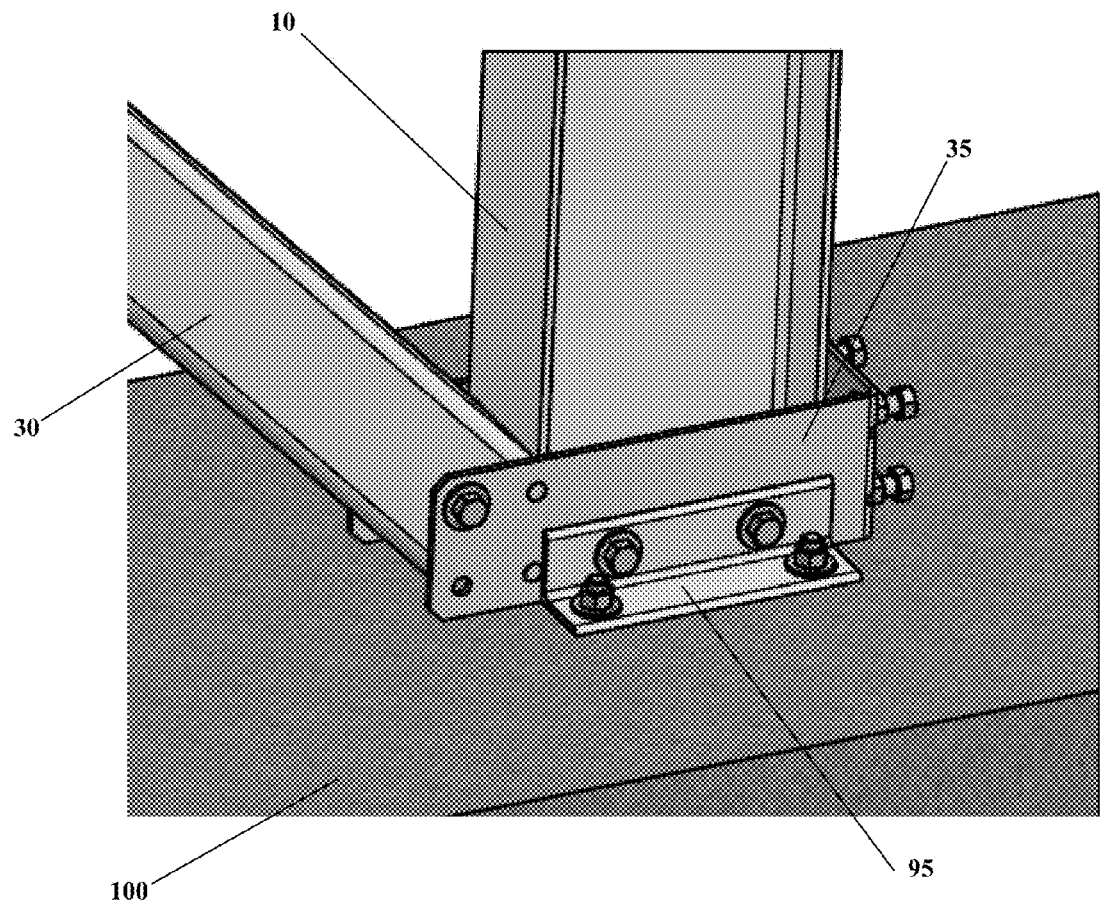
FIG. 11 is a view of a vertical column connection to a pre-cast concrete ballast foundation.

In the modular structural framing system, the vertical I-beam support member 10 of the support structure may be driven into the earth. The earth thus becomes the base foundation upon which the support structure and module mounting structure are mounted. In one embodiment, the vertical I-beam support member 10 may be a standard hot-rolled I-beam if it is a driven pile. In other embodiments, the vertical support member 10 possesses the unique I-beam design taught herein. In these embodiments, a concrete base 100 that has been precast or poured on site with a U-clamp friction bracket 35 connected to the base with a structural angle 95 and anchor bolts is the primary attachment mechanism to the foundation (FIG. 11).

The friction clamps 35 can be affixed to the vertical I-beam support member 10 at any location along its length. Once the location of the clamps has been determined, friction bolts or set screws are used to fasten the clamps 35 to the vertical I-beam 10.

In this photovoltaic module structural framing system embodiment, the structural diagonal brace 30 connects to the vertical support member 10 at the lower friction U-clamp 35 with a thru bolt or pin The diagonal brace 30 connects to the top chord at the U-clamp 50 with a thru bolt or pin. The I-beam top chord 40 is then fastened to the upper friction U-clamp 35 affixed to vertical I-beam 10 using at least one thru bolts.

With the exception of the vertical I-beam support member 10, the remainder of the support structure, i.e., upper friction U-clamps 35, diagonal support brace 30, U-clamps 50, and I-beam top chord channels 40, may be partially pre-assembled at a factory or assembly staging area.

The horizontal support member 10 of the module mounting structure is attached to the top chord 40 of the support structure at the U-clamp brackets 50 at each end of the top chord assembly. The horizontal I-beam members 10 are supported by the U-clamps 50 (FIG. 8) initially by the "hook" feature on the U-clamp 50 and subsequently by thru bolts that connect the web of the horizontal member 10 to the U-clamp 50. The unique U-clamp hook feature allows the large horizontal I-beam members 10 to be hung in place thereby allowing the beams to be adjusted to final position and bolted in place.

The I-beam rail member 45 upon which a module(s) is mounted can be connected to the horizontal member 10 by using bracket 20 and thru bolts and nuts. The rail member 45 may also be attached to the horizontal members 10 as part of a pre-assembled module/rail set. The lower rail-to-horizontal connections are brackets 20 pre-assembled to the rails 45 that interlock by means of a slide clip 60 with the horizontal flange from the applied weight of the module pre-assembly as it is lowered into position. The top rail 45 is attached to the horizontal support member(s) 10 using light gauge brackets 20 that interlock with the horizontal members 10 and top rail's 40 I-beam flanges and clamp the structural members' I-beam flanges together with the use of threaded fasteners through pre-punched holes in the brackets 20. The brackets allow for variable positioning of the top rail members 45 along the horizontal member 10. The brackets may be inserted at any point along the I-beam member's length without need for pre-fabricated apertures in the beams' flanges. The quantity of brackets 20 used at a connection point may vary from one pair to four pairs depending on the strength requirements of the system.

In the context of photovoltaic panels, the photovoltaic panels 75 are connected to the rail member 45 using the same bracket 20 used for the I-beam to I-beam connections above. It should be noted that the unique design of the bracket enables the connection between the I-beam structural member and any flat surface. The photovoltaic modules 75 are held in place to the tops of the rails 45 using a thru bolt and nut. In all I-beam brackets, the option for captive hardware, such as fixed nuts, cage nuts, and studs is also available. In another embodiment, laminate modules may be connected to the rail member by adhesive bonding. However, one of ordinary skill in the art will recognize that the modular structural framing system taught herein can be mounted with other modules, such as solar thermal modules or solar electric laminate modules.

The modular structural framing system is adaptable to various field conditions. For example, if an I-beam is unable to be pile driven into the foundation due to physical impediments (for example, bed rock) or lack of foundation (such as a rooftop), pre-cast concrete may be employed as the foundation. Similarly, the foundation may be a site-poured concrete pier. In pre-cast or site-poured concrete foundations, the vertical support structural member or some other method of connecting the vertical member to the foundation (such as a U-clamp) must be affixed to the concrete foundation. As one would expect, the height of the foundation can change the height of the modular structural framing system. This invention can also be adapted to nearly any foundation system because the vertical support member disclosed above can be any shape structural member.

An advantage of the modular structural framing system disclosed herein is the ability of the framing system to be customized to fit the user's need. Because one size may not fit all with respect to modular structural framing systems, the unique I-beam structural members can be customized and made to order to suit a particular need. Consequently, the dimensions of the flange returns may need to be customized as well. Alternatively, in other situations, one configuration of a modular structural framing system may be universally commercially acceptable for the general public. Accordingly, a partially pre-assembled modular structural framing system with specific dimensions may be sold as a kit.

The structural modular framing system was originally designed for ground mounted photovoltaic arrays. Nevertheless, it can be used or adapted for other embodiments including, but not limited to roof top photovoltaic arrays, carports, canopies, porches or arbors, tents, pallet rackings, shelving, satellite dish mounting structures, sign structures, antenna structures, conveyor systems, playground equipment, gantry systems, bleachers, and general construction use as structural beams, headers, joists, etc.

It is to be understood that while the invention has been described in conjunction with the detailed description thereof, the foregoing description is intended to illustrate and not limit the scope of the invention, which is defined by the scope of the appended claims. Other aspects, advantages and modifications are without the scope of the following claims.

We claim:

1. A photovoltaic structural framing system for ground mounted, high volume photovoltaic panel installation comprising:
    (a) a vertical I-beam support member,
    (b) at least two friction clamps affixed to the vertical I-beam support member by thru bolts or set screws, wherein the at least two friction clamps include an upper friction clamp and a lower friction clamp
    (c) a diagonal support brace,
    (d) an I-beam top chord, wherein the I-beam top chord comprises two separate C-channels,
    (e) at least one horizontal I-beam support member, and
    (f) an I-beam rail member,
    wherein the diagonal support brace is connected to the lower friction clamp affixed to the vertical I-beam support member by thru bolts,
    wherein the other end of the diagonal support brace is connected to the I-beam top chord,
    wherein the I-beam top chord is connected to the upper friction clamp affixed to the vertical I-beam support member by thru bolts,
    wherein the horizontal I-beam support member is connected to the I-beam or C-channel top chord by a U-bracket capable of both connecting the I-beam top chord C-channels using thru bolts and connecting the horizontal support member using thru bolts,
    wherein the I-beam rail member connects to the horizontal support members by a bracket capable of both connecting the I-beam flange of the rail member using a thru bolt and hooking the flange of the horizontal support member, and
    wherein the photovoltaic panels connect to the I-beam rail member by brackets.

2. The photovoltaic structural framing system for ground mounted, high volume photovoltaic panel installation of claim 1, further comprising a base foundation, to which the vertical I-beam support member is attached.

3. The photovoltaic structural framing system for ground mounted, high volume photovoltaic panel installation of claim 2, wherein the base foundation is earthen ground.

4. The photovoltaic structural framing system for ground mounted, high volume photovoltaic panel installation of claim 2, wherein the base foundation is concrete.

5. The photovoltaic structural framing system for ground mounted, high volume photovoltaic panel installation of claim 1, wherein the vertical support member is a pile driven hot-rolled steel I-beam.

6. The photovoltaic structural framing system for ground mounted, high volume photovoltaic panel installation of claim 1, wherein a 90 degree angle is formed between the diagonal support brace and top chord.

7. A combination of several photovoltaic structural framing systems of claim 1.

* * * * *